July 31, 1956  R. P. CLIFFORD ET AL  2,756,590
DEVICE TO RECORD ELONGATION UNDER LOAD
Filed Feb. 16, 1954  2 Sheets-Sheet 1

INVENTOR.
RICHARD P. CLIFFORD
SAMUEL D. GEHMAN
BY
*R. L. Miller*
ATTORNEY

July 31, 1956     R. P. CLIFFORD ET AL     2,756,590
DEVICE TO RECORD ELONGATION UNDER LOAD Filed Feb. 16, 1954     2 Sheets-Sheet 2

INVENTOR.
RICHARD P. CLIFFORD
BY SAMUEL D. GEHMAN

*R. L. Miller*
ATTORNEY

United States Patent Office 2,756,590
Patented July 31, 1956

2,756,590

DEVICE TO RECORD ELONGATION UNDER LOAD

Richard P. Clifford, Reseda, Calif., and Samuel D. Gehman, Akron, Ohio, assignors to The Goodyear Tire & Rubber Company, Akron, Ohio, a corporation of Ohio Application February 16, 1954, Serial No. 410,654

8 Claims. (Cl. 73—89)

This invention relates to an extensometer type of instrument for the measurement of elongation of materials with applied loads, and especially to materials of the class wherein large elongations are experienced under loading.

In the tensile testing of relatively highly-extensible plastics there has existed a need for an accurate, automatic, and direct method of recording elongation and loading. This is particularly evident in connection with vertical testing machines utilizing strain-gage load weighing systems and roll chart recorders.

It is the general object of this invention to provide for continuous and automatic recording of the comparatively large elongations with applied loadings normally encountered in tensile tests of many plastics.

Another object of the invention is to provide a tensile-testing mechanism such that the data is automatically and permanently recorded in a form such that extensive further calculation and interpretation is not necessary to organize the recorded data into workable form.

Yet another object of the invention is to provide for a tensile testing device capable of accommodating a wide range of materials.

Still another object of the invention is to utilize components of an electrical nature for the transmission and recording of test results, thus providing high precision measurement, simplicity, and ease of operation.

A further object of the invention is to provide an apparatus which can be utilized as an inherently complete unit or be readily adapted to function as an integral component of standard commercially available tensile-testing machines.

The foregoing objects of the invention, and other objects which will become apparent as the description proceeds, are achieved by the measurement and recording of the relative displacement of two points on a test strip spaced at an arbitrary fixed distance apart in the direction of stretch. The invention basically utilizes the differential rotation of two rollers as a measure of elongation when the test strip with which they are in contact is elongated due to an applied loading. These rollers are mechanically connected to synchro-generators which in turn when rotated supply an electrical input signal to a servo loop. The output of the loop system is mechanically connected to a recorder chart mechanism which is driven in proportion to the differential rotation of the rollers.

The algebraic sum of the angular displacement of the rollers is directly related to the amount of elongation in the section of the test strip between the lines of contact with the rollers. The recorder strip chart therefore is driven in proportion to the true strain experienced by the length of test strip between the rollers. A stylus contacting the recorder chart is concurrently displaced in proportion to the load applied and the resulting line traced on the chart will then be a direct plot of the elongation against the loading.

A positioning arrangement may be embodied in the extensometer which permits the sensing head containing the rollers to follow the central portion of the test strip as it is elongated. This arrangement is applicable when the expected elongation is such that mechanical interference between the roller and the extremities of the test portion is anticipated.

For a better understanding of the invention, reference is had to the accompanying drawings, wherein.

Figure 1:
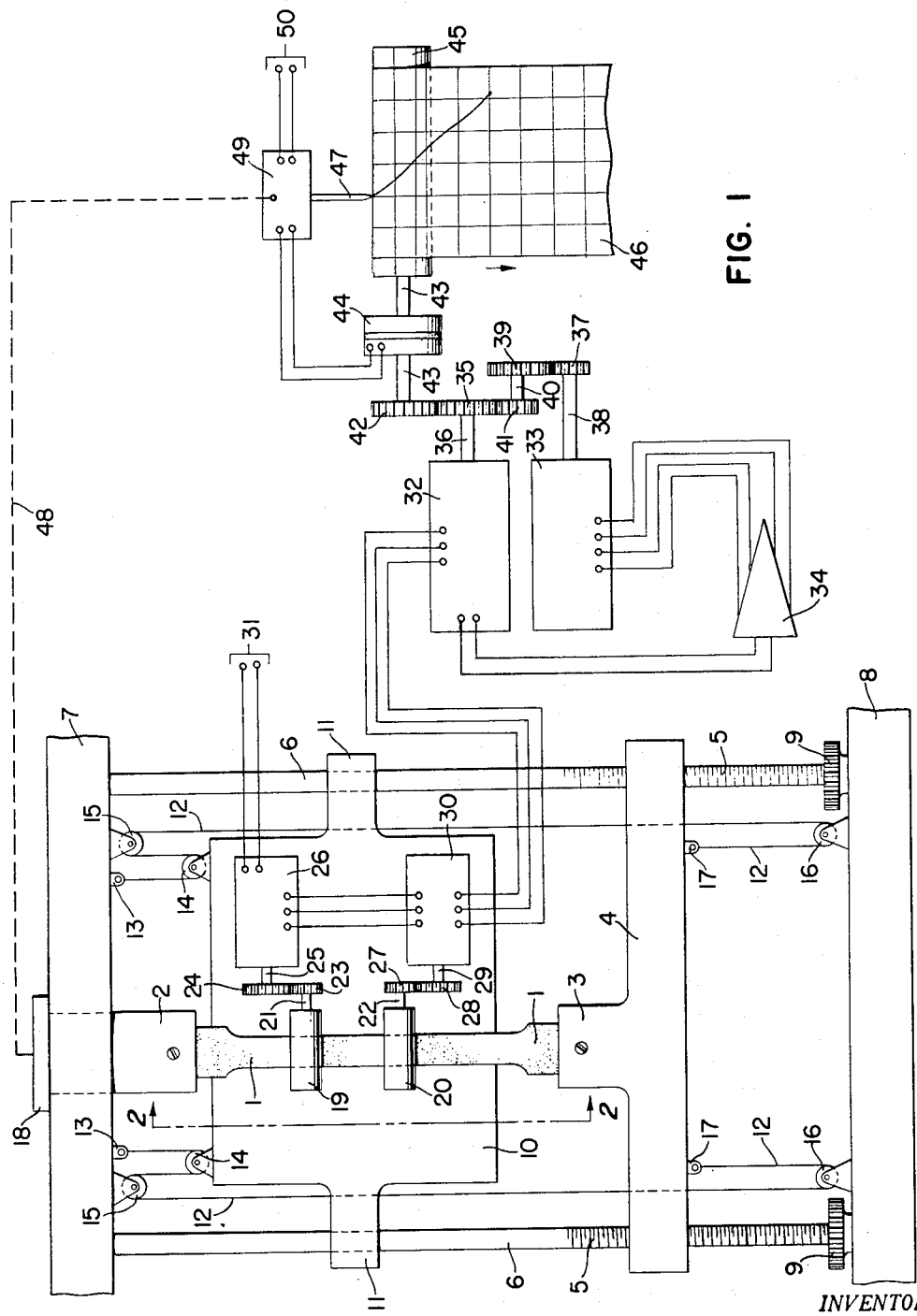
Fig. 1 is a schematic view showing the extensometer.

In Fig. 1 a test strip 1 of the material to be tested, cut or molded into a dumbbell shape such as is commonly used for this purpose, has its extremities held in two clamps, namely, a fixed clamp 2 and a movable clamp 3 mounted on a movable support 4 having internal threads meshing with the threads 5 on rotatable shafts 6. The shafts 6 are rotatably mounted in the fixed supports 7 and 8 and are driven by any suitable mechanism through the intermediary of gears 9 fixed to the shafts 6. By rotating the shafts 6 the support 4 can be caused to move up and down and during the downward movement the test specimen 1 is stretched. Obviously both clamps 2 and 3 could be movable as it is only the relative movement of the clamps that is important. A movable support 10 having bosses at the opposite ends thereof through which the shafts 6 extend is guided for vertical movement on the unthreaded portions of the shafts 6. The mechanism for measuring the elongation of the test specimen is mounted on this support 10 and it is desired that this mechanism be preferably centered with respect to the clamps 2 and 3 at all times. For this purpose there is provided means for imparting to the support 10 a movement equivalent to one-half of the movement of the support 4 as it moves up and down. This mechanism comprises two similar cables 12 fixed at their opposite ends to ears 13 on support 7 and threaded over pulleys 14 and 15 attached respectively to the support 10 and support 7, and then over pulleys 16 attached to the support 8 and with the opposite ends of the cables 12 connected at 17 to the support 4. It is obvious that one cable would be sufficient if connected centrally to the support 10. Due to this pulley arrangement, as the support 4 moves downwardly the support 10 gravitates at only one-half the rate of speed of the support 4. The clamp 2 is connected at its upper end to pressure-responsive means 18 utilized for the purpose of determining the load on the test sample. This will be referred to as a load-sensing cell and as this invention does not reside in the details of the said cell, the same is herein shown and described only diagrammatically.

Figure 2:
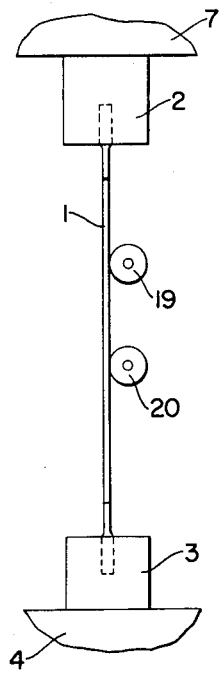
Fig. 2 is a view taken on the line 2—2 of Fig. 1.

The means for measuring the elongation of the test sample comprises two rollers 19 and 20 on shafts 21 and 22 respectively and mounted to rotate in fixed bearings on the support 10. As the test sample is elongated the rollers 19 and 20 are rotated by the movement of the material of the test sample and this rotation is transmitted through suitable mechanism to a recording means which records the amount of elongation occurring in the sample. A side view taken along the axis 2—2 of Figure 1 is shown in Figure 2.

The roller 19 is mounted on a shaft 21 whereupon a spur gear 23 meshing with a spur gear 24 is also mounted. The spur gear 24 is mounted on the rotor shaft 25 of a self-synchronous generator 26. Similarly, the roller 20 is mounted on a shaft 22 whereupon a spur gear 27 meshing with a spur gear 28 is also mounted. The spur gear 28 is mounted on the rotor shaft 29 of a synchro-differential generator 30.

The self-synchronous generator 26 is energized from an external electrical power source through the terminals 31 and is electrically connected to the synchro-differential generator 30, which in turn is electrically connected to the synchro-control transformer 32; the latter being electrically connected to a servo-motor 33 through a servo-amplifier 34.

A spur gear 35 is mounted on a shaft 36 which is connected to the synchro-control transformer 32. The servomotor 33 drives a spur gear 37 mounted on the shaft 38. The spur gear 37 meshes with a spur gear 39 which is on a common shaft 40 with a spur gear 41, and the gear 41 engages the spur gear 35. The spur gear 35 also meshes with a spur gear 42, which is mounted on a common shaft 43 together with a magnetic clutch 44. The shaft 43 is also connected to a roller drive 45 over which a strip-chart 46 is moved.

A recording stylus 47 records the loading applied to the test strip 1. Methods of accomplishing this are well known in the art and for purposes of illustration, a load-sensing cell 18, such as a strain-gage type, is embodied within the upper member 7 and transmits a signal, representative of the loading applied, through the connecting line 48 to a stylus-moving mechanism 49, thereby displacing the stylus 47 proportionally. The magnetic clutch 44 is energized from a source of electrical energy applied at a set of terminals 50 through the stylus-moving mechanism 49. Within the stylus-moving mechanism 49, means well known in the art, such as an on-off switch, are utilized to deactivate the clutch 44 when the stylus 47 is in the zero-loading position. Any sudden breakage of the test strip 1 or other malfunction resulting in a rapid and sudden rotation of the rollers 19 and 20 with consequent spilling of excessive quantities of the strip-chart 46 is thus prevented.

As the movable clamp 3 is progressively displaced from the fixed clamp 2, a loading is applied to the test strip 1, stretching the test strip 1 and rotating the rollers 19 and 20 proportionally. The difference in rotation of the rollers 19 and 20, due to the stretch of the test strip 1 between the lines of contact of the rollers 19 and 20, supplies an error signal through the consequent rotation of the self-synchronous generator 26 and the synchro-differential generator 30. This signal is applied to the servomotor 33 through the synchro-control transformer 32 and the servo-amplifier 34 in the order named. The servomotor 33, through the previously described connecting gear train, drives the strip-chart 46. Simultaneously, the synchro-control transformer 32 is driven by the movement of the gear 35 in such a direction and by such an amount as to tend to zero the error signal originally received.

The resulting recorded line on the strip-chart 46 is such that it is directly representative of the load-elongation curve for the material being tested. It is understood that the invention is not limited in the use of a strip-chart recorder; other types such as a flat disc-type chart are equally suited for use herein.

Figure 3:
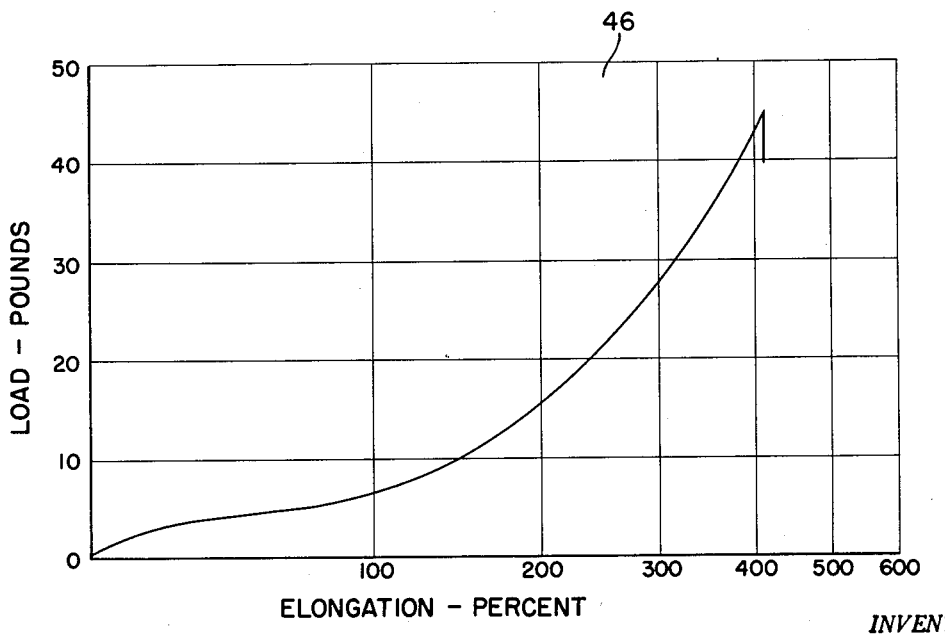
Fig. 3 is a graph of experimental results for a GR–S tread as recorded on a strip chart.

Fig. 3 shows a load-elongation curve for a test strip of a GR-S tread compound as recorded by the invention. It will be noted that the elongation is scaled in a logarithmic manner. This is a characteristic of the mechanical system of the invention; the elongation being a function of the stretch occurring between the two rollers spaced at a fixed distance. As a consequence, the region in which the slope of the curve is slight is on on the most extended portion of the logarithmic elongation scale, resulting in higher accuracy at the section of the graph where it is most effective.

The invention will accommodate a wide range of relatively highly-extensible plastics. It has been successfully utilized to test materials ranging from gum rubber to fairly hard shoe-sole composition. By designing the gear ratios properly, and proportionally adapting the invention, the tensile characteristics of materials such as metals could be measured.

While certain representative embodiments and details have been shown for the purpose of illustrating the invention, it will be apparent to those skilled in this art that various changes and modifications may be made therein without departing from the spirit or scope of the invention.

We claim:

1. An extensometer comprising clamping means for elongating a test strip by increasing the loading on the test strip, load sensing means operatively connected to the clamping means, a source of electrical energy, a self-synchronous generator electrically coupled to the source of electrical energy, connecting means between the self-synchronous generator and a point on the test strip to transmit and transform any linear movement of said point to a rotational movement of the self-synchronous generator shaft, a synchro-differential generator electrically coupled to the self-synchronous generator, connecting means between the synchro-differential generator and another point on the test strip to transmit and transform any linear movement of said point to a rotational movement of the synchro-differential generator shaft, a synchro-control transformer electrically coupled to the synchro-differential generator, a servo-amplifier, a servomotor electrically coupled to the synchro-control transformer through the servo-amplifier, and a strip-chart mechanism mechanically coupled to the servomotor and the synchro-control transformer and with the stylus thereof actuated by said load sensing means.

2. An extensometer comprising means for elongating a test strip by increasing the loading on the test strip, load sensing means operatively connected to said elongation means, a first roller firmly in contact with the test strip, a second roller spaced at an arbitrarily fixed distance from the first roller and also firmly in contact with the test strip, a source of electrical energy, a self-synchronous generator electrically coupled to the source of electrical energy and mechanically coupled to the first roller, a synchro-differential generator electrically coupled to the self-synchronous generator and mechanically coupled to the second roller, a synchro-control transformer electrically coupled to the synchro-differential generator, a servo-amplifier, a servomotor electrically coupled to the synchro-control transformer though the servo-amplifier, and a strip-chart mechanism mechanically coupled to the servomotor and the synchro-control transformer and with the stylus thereof actuated by said load sensing means.

3. An extensometer comprising means for elongating a test strip by increasing the loading on the test strip, load sensing means operatively connected to said elongating means, a first roller firmly in contact with the test strip, a second roller spaced at an arbitrarily fixed distance from the first roller and also firmly in contact with the test strip, a source of electrical energy, a self-synchronous generator electrically coupled to the source of electrical energy and mechanically coupled to the first roller, a synchro-differential generator mechanically coupled to the second roller and electrically coupled to the self-synchronous generator, a synchro-control transformer electrically coupled to the synchro-differential generator, a servo-amplifier, a servomotor electrically coupled to the synchro-control transformer through the servo-amplifier, a strip-chart mechanism mechanically coupled to the servomotor and the synchro-control transformer and with the stylus thereof actuated by said load sensing means, and clutching means to provide for mechanically disconnecting the strip-chart mechanism from the servomotor and the synchro-control transformer.

4. An extensometer comprising means for elongating a test strip by increasing the loading on the test strip, load sensing means operatively connected to said elongating means, a first roller firmly in contact with the test strip, a second roller spaced at an arbitrarily fixed distance from the first roller and firmly in contact with the test strip, a source of electrical energy, a self-synchronous generator electrically coupled to the source of electrical energy mechanically coupled to the first roller, a synchro-differential generator electrically coupled to the self-synchronous generator and mechanically coupled to the second roller, a synchro-control transformer electrically coupled to the synchro-differential generator, a servo-amplifier, a servomotor electrically coupled to the synchro-control transformer through the servo-amplifier, a strip-chart mechanism mechanically coupled to the servomotor and the synchro-control transformer and with the stylus thereof actuated by said load sensing means, a clutching means to provide for mechanically disconnecting the strip-chart mechanism from the servomotor and the synchro-control transformer, and elongation compensation means for maintaining the same relative positioning of the first and second rollers with reference to the test strip during the elongation of the test strip.

5. An extensometer comprising clamping means for elongating a test strip by controllably increasing the loading on the test strip, load sensing means operatively connected to the clamping means, a source of electrical energy, a self-synchronous generator electrically coupled to the source of electrical energy, connecting means between the self-synchronous generator and a point on the test strip to transmit and transform any linear movement of said point to a rotational movement of the self-synchronous generator shaft, a synchro-differential generator electrically coupled to the self-synchronous generator, connecting means between the synchro-differential generator and another point on the test strip to transmit and transform any linear movement of said point to a rotational movement of the synchro-differential generator shaft, a synchro-control transformer electrically connected to a synchro-differential generator, a servo-amplifier, a servomotor electrically connected to the synchro-control transformer through the servo-amplifier, a magnetic clutch connected by a gear train to the servomotor and the synchro-control transformer, a strip-chart mechanism driven by the output shaft of the magnetic clutch and with the stylus thereof actuated by said load sensing means, and switching means for energizing and de-energizing the magnetic clutch and actuated by the positioning of the recording stylus of the strip-chart mechanism.

6. An extensometer comprising means for elongating a test strip by increasing the loading on the test strip, load sensing means operatively connected to said elongating means, a first roller firmly in contact with the test strip, a second roller spaced at an arbitrarily fixed distance from the first roller and also firmly in contact with the test strip, a source of electrical energy, a self-synchronous generator coupled to the source of electrical energy, a gear train connecting the self-synchronous generator and the first roller, a synchro-differential generator electrically coupled to the self-synchronous generator, a gear train connecting the synchro-differential generator to the second roller, a synchro-control transformer electrically connected to the synchro-differential generator, a servo-amplifier, a servomotor electrically connected to the synchro-control transformer through the servo-amplifier, and a strip-chart mechanism connected by a gear train to the servomotor and the synchro-control transformer and with the stylus thereof actuated by said load sensing means.

7. An extensometer comprising means for elongating a test strip by controllably increasing the loading on the test strip, load sensing means operatively connected to said elongating means, a first roller firmly in contact with the test strip, a second roller spaced at an arbitrarily fixed distance from the first roller and also firmly in contact with the test strip, a source of electrical energy, a self-synchronous generator coupled to the source of electrical energy, a gear train connecting the self-synchronous generator and the first roller, a synchro-differential generator electrically coupled to the self-synchronous generator, a gear train connecting the synchro-differential generator to the second roller, a synchro-control transformer electrically connected to the synchro-differential generator, a servo-amplifier, a servomotor electrically connected to the synchro-control transformer through the servo-amplifier, a strip-chart mechanism connected by a gear train to the servomotor and the synchro-control transformer and with the stylus thereof actuated by said load sensing means, and elongation compensation means for maintaining the same relative positioning of the first and second rollers with reference to the test strip during the elongation of the test strip.

8. An extensometer comprising means for elongating a test strip by controllably increasing the loading on the test strip, load sensing means operatively connected to said elongating means, a first roller firmly in contact with the test strip, a second roller spaced at an arbitrarily fixed distance from the first roller and also firmly in contact with the test strip, a source of electrical energy, a self-synchronous generator coupled to the source of electrical energy, a gear train connecting the self-synchronous generator and the first roller, a syncro-differential generator electrically coupled to the self-synchronous generator and mechanically connected by a gear train to the second roller, a synchro-control transformer electrically connected to the synchro-differential generator, a servo-amplifier, a servomotor electrically connected to the synchro-control transformer through the servo-amplifier, a magnetic clutch, a gear train connecting the magnetic clutch to the servomotor and the synchro-control transformer, a strip-chart mechanism driven by the output shaft of the magnetic clutch and with the stylus thereof actuated by said load sensing means, switching means to energize and de-energize the magnetic clutch and actuated by the positioning of the recording stylus of the strip-chart mechanism, and elongation compensation means for maintaining the same relative positioning of the first and second rollers with reference to the test strip during the elongation of the test strip.

References Cited in the file of this patent

UNITED STATES PATENTS

| | | |
|---|---|---|
| 1,015,305 | Fentzloff | Jan. 23, 1912 |
| 2,091,534 | Templin | Aug. 31, 1937 |
| 2,316,914 | Templin | Apr. 20, 1943 |
| 2,351,574 | Siversten | June 13, 1944 |
| 2,560,135 | Shearer | July 10, 1951 |
| 2,650,432 | Adams | Sept. 1, 1953 |